(12) United States Patent
Poorrezaei

(10) Patent No.: US 10,506,536 B2
(45) Date of Patent: Dec. 10, 2019

(54) TIME DISTRIBUTION SCHEME FOR WIRELESS MESH NETWORKS

(71) Applicant: Silver Spring Networks, Inc., San Jose, CA (US)

(72) Inventor: Kamal Poorrezaei, San Jose, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 36 days.

(21) Appl. No.: 15/452,630

(22) Filed: Mar. 7, 2017

(65) Prior Publication Data

US 2018/0263007 A1    Sep. 13, 2018

(51) Int. Cl.
| | | |
|---|---|---|
| *H04W 28/02* | (2009.01) | |
| *H04W 56/00* | (2009.01) | |
| *H04W 52/02* | (2009.01) | |
| *H04W 84/18* | (2009.01) | |

(52) U.S. Cl.
CPC ..... *H04W 56/0015* (2013.01); *H04W 28/021* (2013.01); *H04W 28/0221* (2013.01); *H04W 52/0216* (2013.01); *H04W 52/0222* (2013.01); *H04W 84/18* (2013.01); *Y02D 70/00* (2018.01);
(Continued)

(58) Field of Classification Search
CPC ... H04W 40/02; H04W 40/246; H04W 40/24; H04W 40/248; H04W 40/08; H04W 40/00; H04W 40/10; H04W 40/28; H04W 8/005; H04L 45/00; H04L 45/122; H04L 45/20; H04L 43/10

See application file for complete search history.

(56) References Cited

U.S. PATENT DOCUMENTS

| | | |
|---|---|---|
| 2008/0165761 A1 | 7/2008 | Goppner et al. |
| 2010/0029230 A1 | 2/2010 | Linsky |
| 2012/0275317 A1 | 11/2012 | Geva et al. |

(Continued)

FOREIGN PATENT DOCUMENTS

| | | | |
|---|---|---|---|
| EP | 2 893 656 B1 | 11/2016 | |
| WO | WO-2014037685 A1 * | 3/2014 | ............ H04J 3/0667 |
| WO | 2016/123561 A1 | 8/2016 | |

OTHER PUBLICATIONS

International Search Report for application No. PCT/US2018/020984 dated May 8, 2018.

*Primary Examiner* — Jae Y Lee
*Assistant Examiner* — Aixa A Guadalupe Cruz
(74) *Attorney, Agent, or Firm* — Artegis Law Group, LLP

(57) ABSTRACT

A wireless mesh network includes a mesh of continuously-powered devices (CPDs) and a mesh of battery-powered devices (BPDs). The BPDs are organized into hop layers based on hopping distance to the mesh of CPDs. The CPDs transmit time beacons to BPDs in a first hop layer during a first receive window associated with the first hop layer. The BPDs in the first hop layer then transmit time beacons to BPDs in a second hop layer during a second receive window. In this manner, the wireless mesh network propagates time values throughout the BPD mesh. Based on these time values, the BPDs power on during short time intervals to exchange data with neighboring BPDs, and then power off for longer time intervals, thereby conserving battery power. The techniques described herein for conserving battery power for BPDs may also be applied to conserve power consumption of CPDs.

20 Claims, 13 Drawing Sheets

(52) U.S. Cl.
CPC .......... *Y02D 70/1224* (2018.01); *Y02D 70/20* (2018.01); *Y02D 70/22* (2018.01)

(56) References Cited

U.S. PATENT DOCUMENTS

| | | |
|---|---|---|
| 2013/0016757 A1 | 1/2013 | Hui et al. |
| 2013/0044658 A1 | 2/2013 | Zhu et al. |
| 2016/0226747 A1* | 8/2016 | Flammer, III ........ H04W 24/08 |
| 2016/0227543 A1* | 8/2016 | Flammer, III ........ H04W 24/08 |

* cited by examiner

TIME DISTRIBUTION SCHEME FOR WIRELESS MESH NETWORKS

BACKGROUND OF THE INVENTION

Field of the Invention

Embodiments of the present invention relate generally to wireless network communications and, more specifically, to a time distribution scheme for wireless mesh networks.

Description of the Related Art

A conventional wireless mesh network includes a plurality of nodes configured to communicate with one another. In certain types of heterogeneous wireless mesh networks, both continuously-powered nodes (CPDs) and battery-powered nodes (BPDs) reside within the mesh network and communicate with one another.

In many instances, CPDs are coupled to a power grid and have continuous access to power (except during power outages). CPDs typically reside in a subdomain of the overarching mesh network referred to as the "CPD mesh." BPDs, on the other hand, are battery-powered and therefore have only a finite supply of power. BPDs reside in a different subdomain of the overarching mesh network referred to as the "BPD mesh." In operation, the CPDs and BPDs may implement substantially the same communication protocol. In such cases, the nodes within one subdomain of the wireless network communicate in a manner that is consistent with how nodes in the other subdomain of the wireless network communicate.

When CPDs are coupled to the power grid, the CPDs can be configured to remain powered on for long intervals of time. During those intervals, a given CPD may continuously perform transmit and receive operations. Conversely, because BPDs have only a limited supply of battery power, the BPDs are usually configured to remain powered off for long intervals of time. For example, a given BPD may power on during a scheduled communication window, transmit and/or receive data, and then return to a powered off state. In practice, a BPD mesh may remain powered off 97% percent of the time in order to conserve power.

With respect to coordinating communications with one another, the BPDs include a clock circuit that maintains an estimate of the current time. However, conventional BPDs oftentimes cannot maintain an accurate estimate of time due to power limitations. In particular, BPDs typically lack sufficient power to support clock correction hardware, such as temperature-controlled oscillators. Consequently, the clock of a conventional BPD may be subject to significant clock drift, which can prevent the BPD from accurately predicting when a communication window is to occur. If a given BPD is not active during a particular communication window, then that BPD cannot communicate with other BPDs active during the communication window. In such a situation, the BPD may become separated from the mesh network.

One solution to the above problem is to source time updates into the BPD mesh from the CPD mesh. In many implementations, for example, the CPD mesh may be coupled to a source of accurate time, such as a NTP server. With this approach, the CPD mesh can provide the BPD mesh with periodic time updates. In practice, the CPD mesh transmits a time beacon to edge nodes in the BPD mesh, and those nodes along with the intermediate nodes in the BPD mesh then propagate the time beacon across the BPD mesh. One problem with this approach, however, is that with larger BPD meshes the accuracy of the time beacon can degrade significantly as the time beacon traverses the BPD mesh. Consequently, BPDs at the fringes of the BPD mesh can end up with inaccurate estimates of time, which can cause those nodes to miss communication windows. In such cases, those portions of the wireless mesh network can lose connectivity and cease to operate normally.

As the foregoing illustrates, what is needed in the art are more effective approaches for coordinating communications across battery-powered devices in wireless mesh networks.

SUMMARY OF THE INVENTION

One embodiment of the present invention sets forth a computer-implemented method for coordinating time across a mesh network, including determining a first receive window associated with a first hop layer of the wireless mesh network, wherein a first node resides within the first hop layer, determining a second receive window associated with a second hop layer of the wireless mesh network, wherein a second node resides within the second hop layer, receiving a first set of time beacons during the first receive window, generating a first time beacon based on the first set of time beacons, and transmitting the first time beacon from the first node to the second node during the second receive window.

At least one advantage of the technique described herein is that battery-powered devices can operate within the wireless mesh network for long periods of time with a limited energy supply while maintaining coordinated communications with one another.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
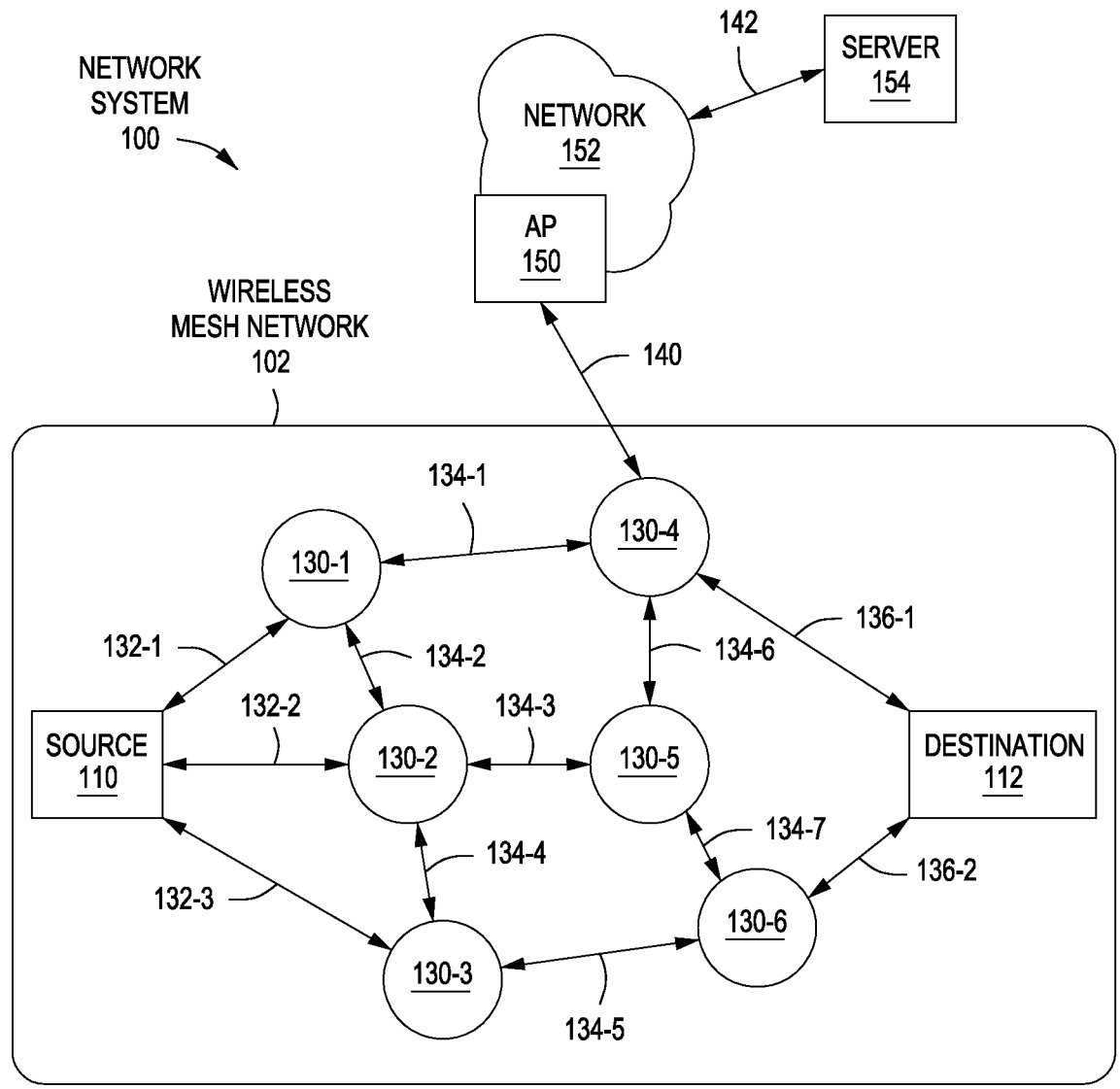
FIG. 1 illustrates a network system configured to implement one or more aspects of the present invention.

FIG. 1 illustrates a network system configured to implement one or more aspects of the present invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 is a computing device, including a processor and memory, and executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement any and all embodiments of the invention by operation of the network interface. An exemplary network interface is described below in conjunction with FIG. 2.

Figure 2:
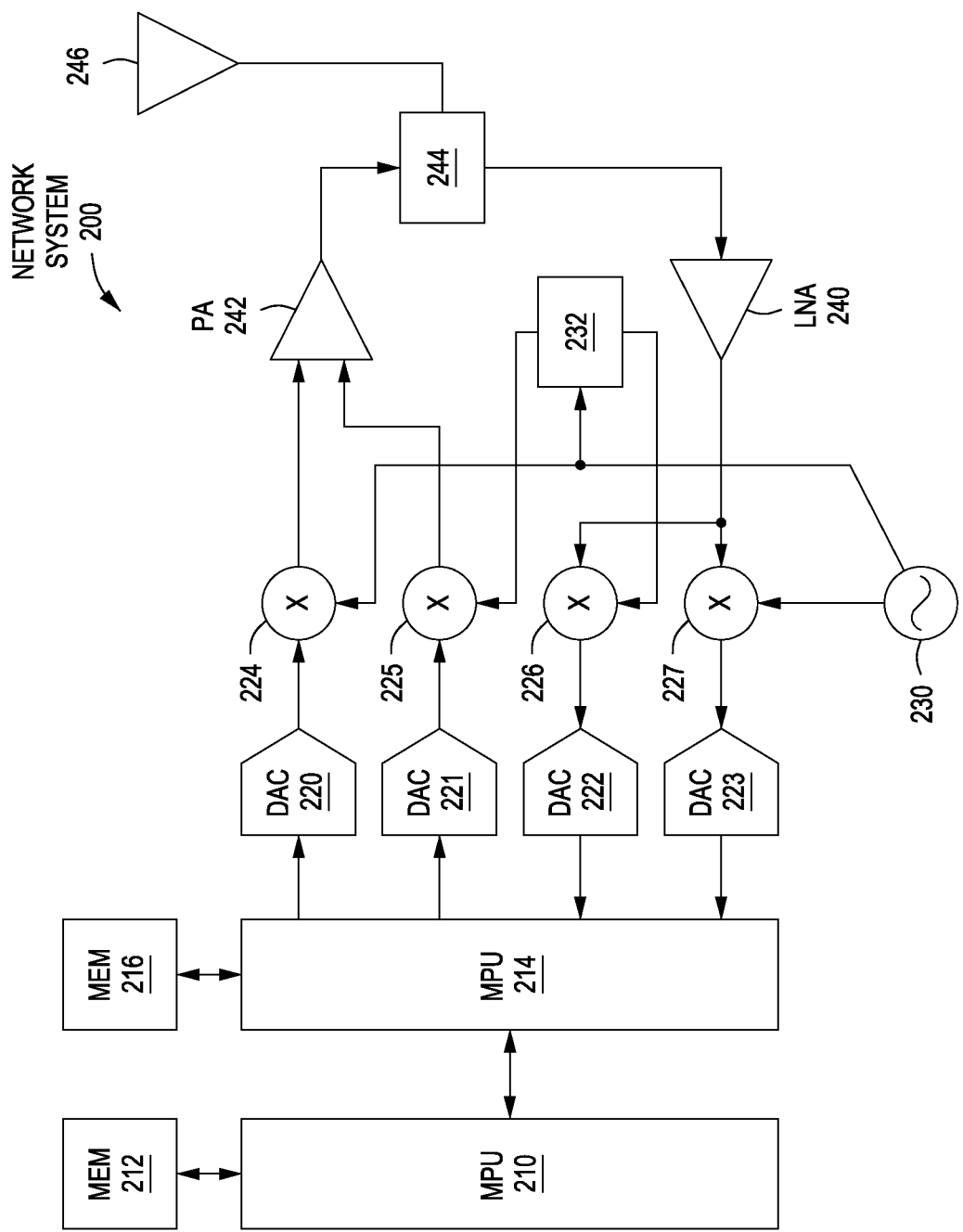
FIG. 2 illustrates a network interface configured to transmit and receive data within the mesh network of FIG. 1, according to various embodiments of the present invention.

FIG. 2 illustrates a network interface configured to transmit and receive data within the mesh network of FIG. 1, according to various embodiments of the present invention.

Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. Oscillator 230 may be coupled to a clock circuit (not shown) configured to maintain an estimate of the current time. MPU 210 may be configured to update this time estimate, and other data associated with that time estimate, by implementing the techniques described in greater detail below in conjunction with FIGS. 3A-9B.

A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or DSP 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or DSP 214 may buffer within memory 212 and/or memory 216 any portion of data received across the set of channels from which antenna 246 receives data, including all such data. MPU 210 and/or DSP 214 may then perform various operations with the buffered data, including demodulation operations, decoding operations, and so forth.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring generally to FIGS. 1-2, under various circumstances, nodes 130 may transmit messages to server 154 that reflect various operating conditions associated with those nodes 130. The operating conditions associated with a given node 130 could include, for example, a set of environmental conditions and/or events detected by the node 130, status information associated with the portion of the wireless mesh network 202 to which the node 130 is coupled, and status information associated with a utility grid the node 130 is configured to monitor. In addition, nodes 130 may transmit messages to each other according to a transmission schedule. To follow the transmission schedule, each node 130 maintains a clock that can be updated based on time beacons received from neighboring nodes. The distribution of time beacons is discussed in greater detail below in conjunction with FIGS. 3A-9B.

Distributing Time Across a Wireless Mesh Network

FIGS. 3A-3D illustrates how time beacons are propagated to successive layers of battery-powered devices within the wireless mesh network of FIG. 1, according to various embodiments of the present invention.

Figure 3A:
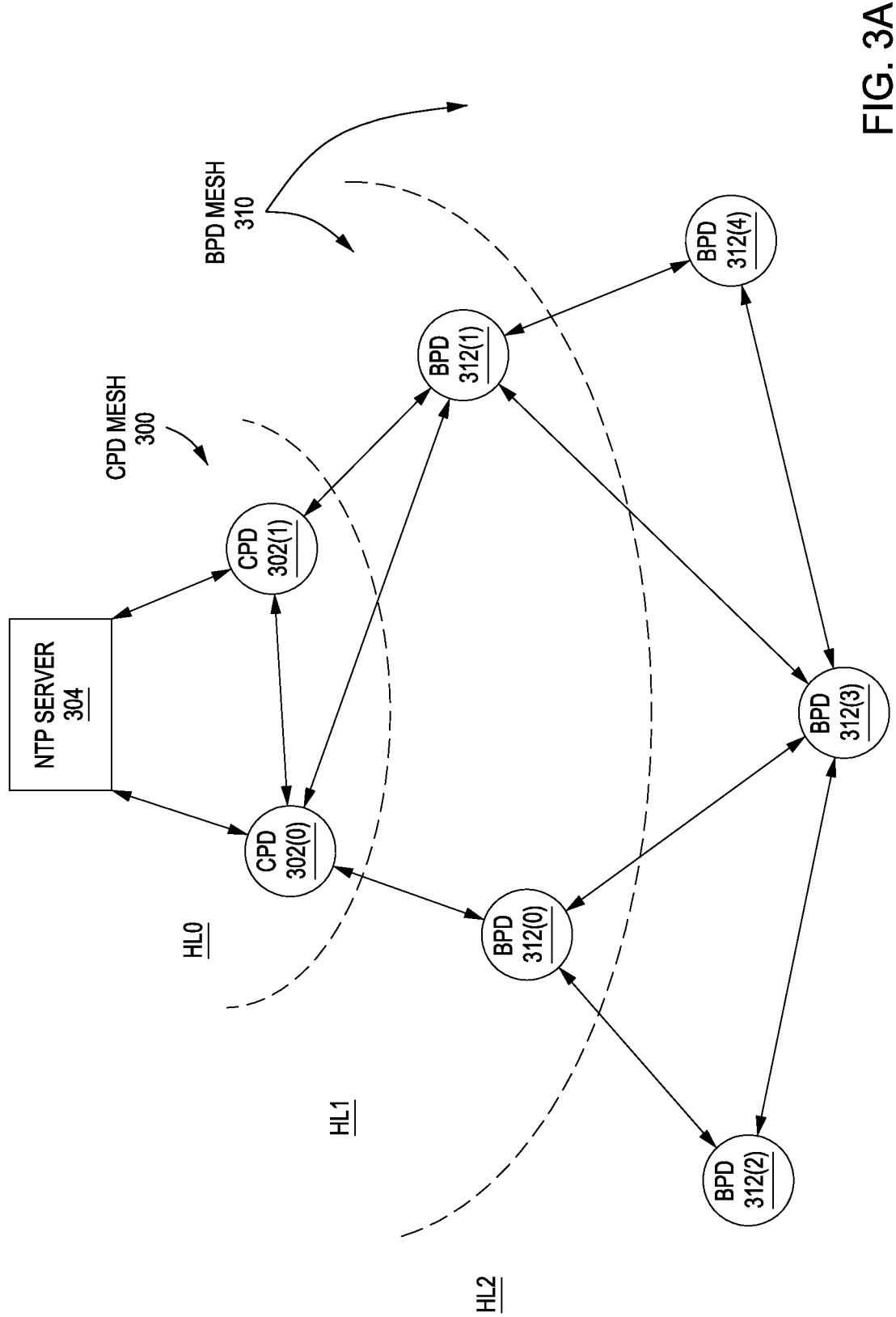
FIGS. 3A-3D illustrates how time beacons are propagated to successive layers of battery-powered devices within the wireless mesh network of FIG. 1, according to various embodiments of the present invention.

As shown in FIG. 3A, wireless mesh network 102 of FIG. 3A is divided into a continuously-powered device (CPD) mesh 300 and a battery-powered device (BPD) mesh 310. CPD mesh 300 includes CPDs 302(0) and 302(1) as well as a network time protocol (NTP) server 304. CPDs 300 may include one or more nodes 130 and/or APs 150 of FIG. 1. BPD mesh 310 includes BPDs 312(0) through 312(4). BPDs 312 may include one or more nodes 130 of FIG. 1. As a general matter, data that is transmitted from CPD mesh 300 to BPD mesh 310 is referred to herein as "outbound" data and may be described as traveling in an "outbound" or "downlink" direction. Similarly, data that is transmitted from BPD mesh 310 towards CPD mesh 300 is referred to herein as "inbound" data and may be described as traveling in an "inbound" or "uplink" direction.

BPDs 312 of BPD mesh 310 are included in different "hop layers" based on hopping distance to CPD mesh 300. BPDs 312(0) and 312(1) are included in hop layer one (HL1) because those nodes are one hop away from CPD mesh 300. BPDs 312(2) through 312(4) are included in hop layer two (HL2) because those nodes are two hops away from CPD mesh 300. Wireless mesh network 102 is configured to propagate time beacons across CPD mesh 300 and BPD mesh 310 in a coordinated manner based on hop layer, as described in greater detail below.

Figure 3B:
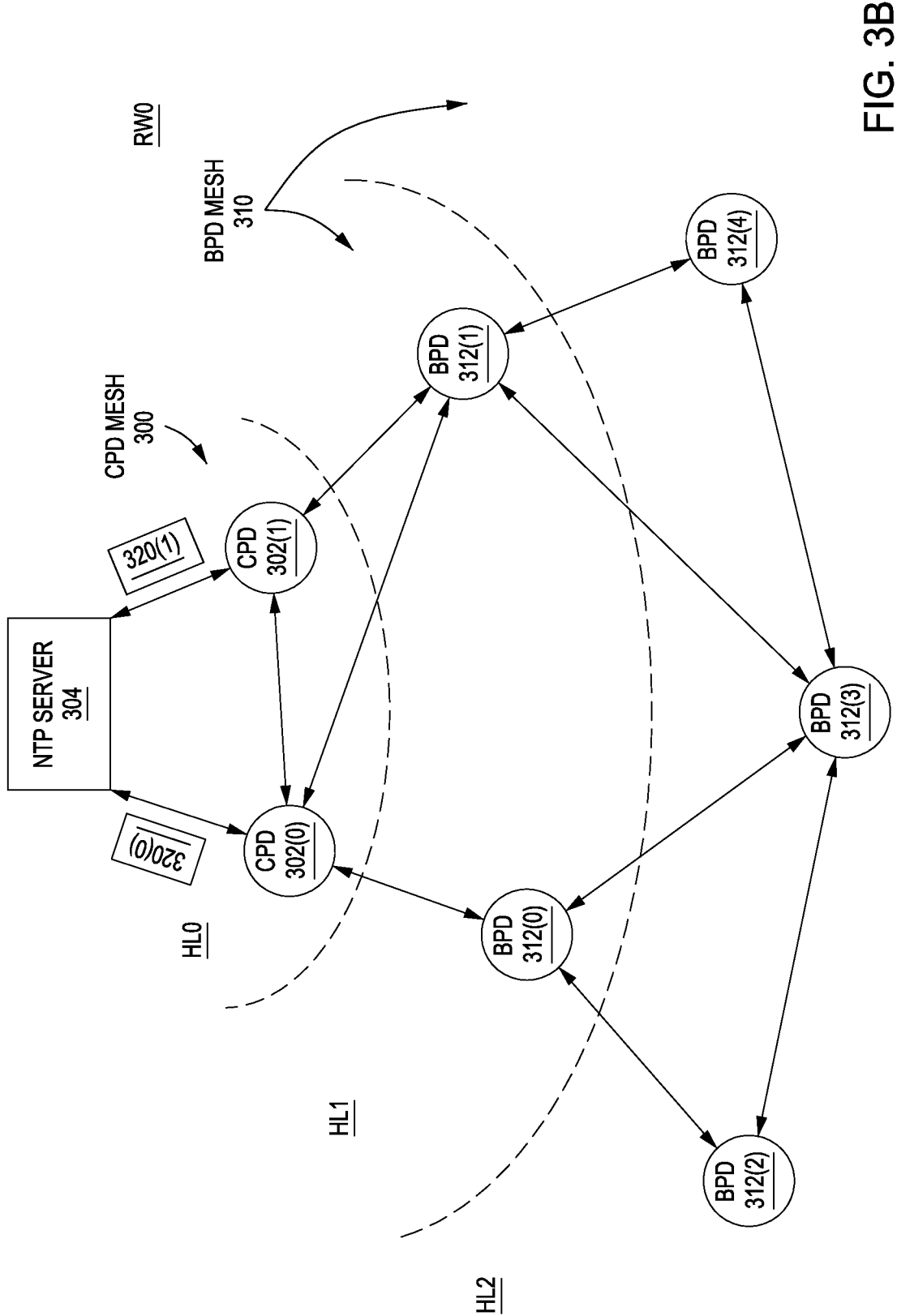

As shown in FIG. 3B, NTP server 304 is configured to transmit time beacons 320(0) and 320(1) to CPDs 302(0) and 302(1). These transmissions could occur during a receive window zero (RW0) or during any other receive window. NTP server 304 could be, for example, a National Institute of Standards and Technology (NIST) Internet time server (ITS). CPDs 302 receive these time beacons and update internal clocks. Because CPDs 302 have continuous access to power, CPDs 302 may operate in receive mode most of the time and therefore receive time beacons 320 and perform clock updates frequently. In addition, because CPDs 302 are continuously-powered, CPDs 302 may implement temperature compensated oscillators (TCXOs) or other time correction techniques in order to minimize clock drift. Thus, CPDs 302 may maintain reasonably accurate time estimates that can then be periodically transmitted into BPD mesh 310, as described below.

Figure 3C:
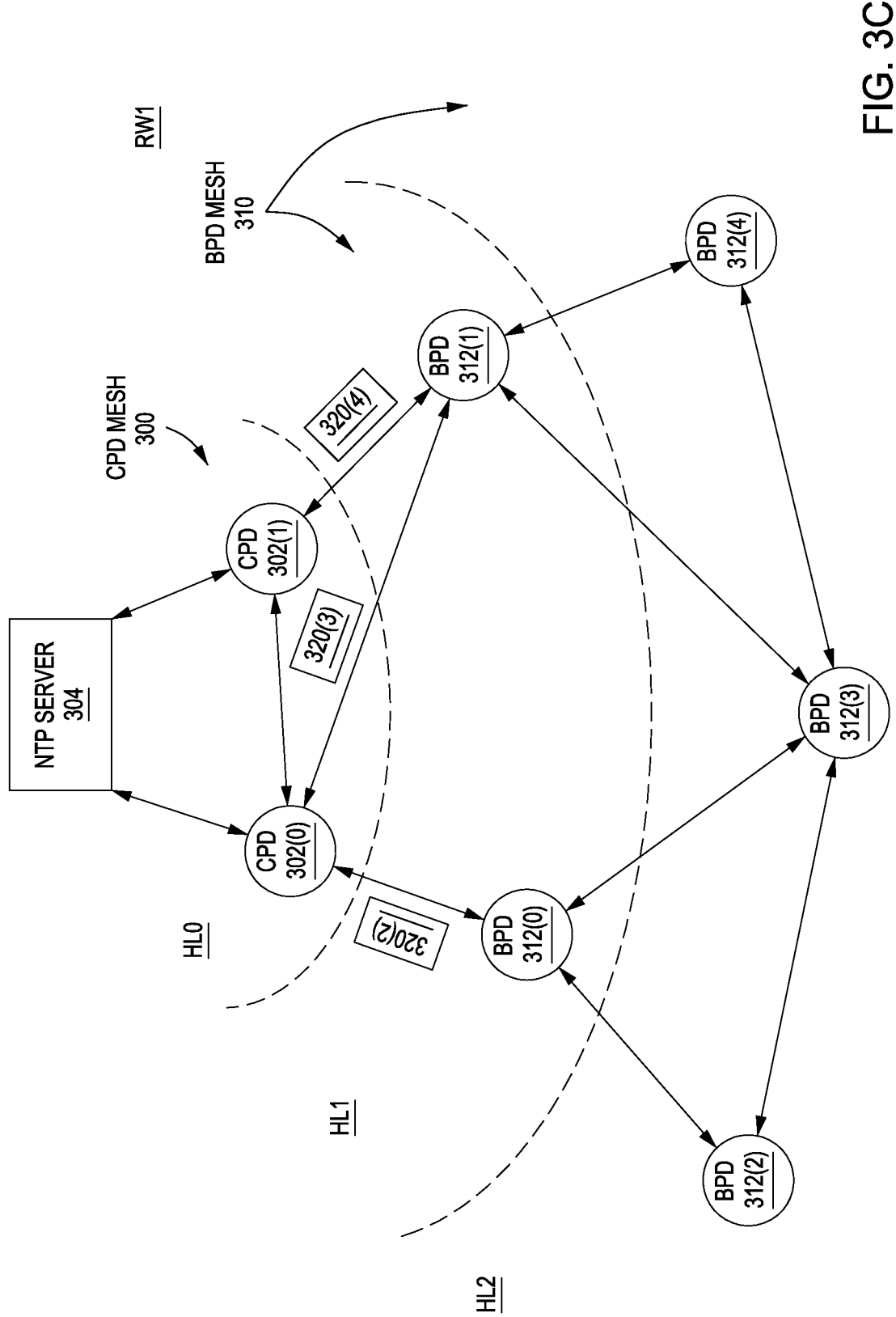

As shown in FIG. 3C, during a receive window one (RW1) associated with HL1, CPDs 302(0) and 302(1) transmit time beacons 320(2), 320(3), and 320(4) into BPD mesh 310. In particular, CPD 302(0) transmits time beacons 320(2) and 320(3) to BPDs 312(0) and 312(1), respectively, and CPD 302(1) transmits time beacon 320(4) to BPD 312(1). BPDs 312 receive these time beacons and perform a clock update using a procedure that is described in greater detail below in conjunction with FIGS. 6A-9C.

Figure 3D:
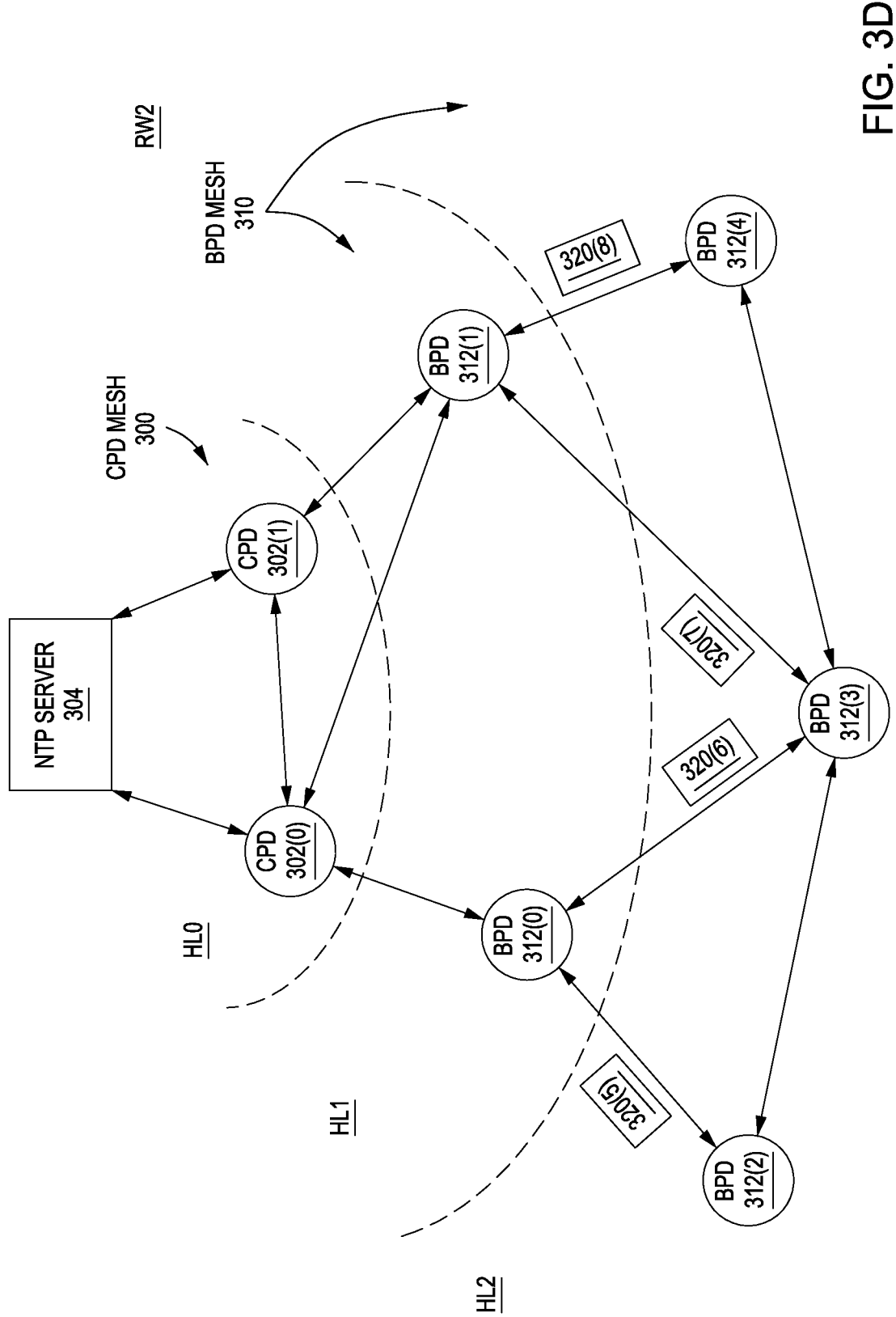

As shown in FIG. 3D, BPDs 312 then generate and transmit time beacons 320(5), 320(6), 320(7) and 320(8) during receive window two (RW2). Specifically, BPD 312 (0) transmits time beacons 320(5) and 320(6) to BPDs 312(2) and 312(3) respectively, and BPD 312(1) transmits time beacons 320(7) and 320(8) to BPDs 312(3) and 312(4), respectively. BPDs 312(2), 312(3) and 312(4) may then transmit additional time beacons in an outbound direction provided wireless mesh network 102 includes additional hop layers (none shown). Each BPD 312 may also broadcast time beacons to neighbors so that time beacon transmissions from a given BPD 312 to neighboring BPDs 312 occur at substantially the same time.

Referring generally to FIGS. 3A-3D, CPD mesh 300 and BPD mesh 310 interoperate in the above manner in order to distribute time beacons 320 throughout wireless mesh network 102. By transmitting time beacons 320 in the coordinated manner described above, wireless mesh network 102 can minimize the amount of time that each BPD 312 is active and receiving time beacons, thereby conserving battery life. In addition, by sourcing accurate time throughout wireless mesh network 102 as described, BPDs 312 can coordinate general data communications according to a relatively strict schedule, thereby minimizing the amount of time those BPDs 312 are actively receiving data. The coordination of time beacon transmissions is described in greater detail below in conjunction with FIGS. 4A-4C.

Figure 4A:
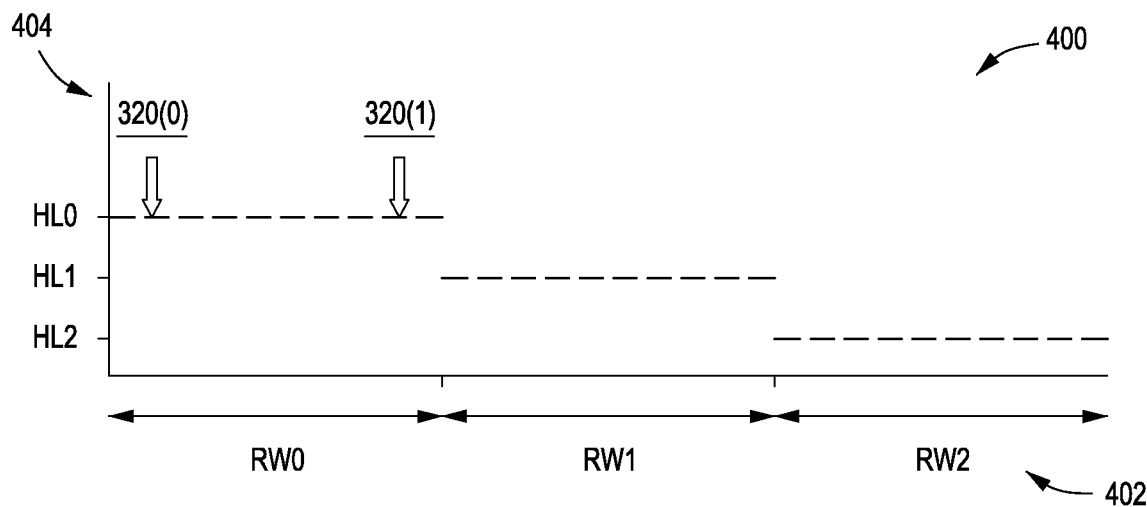
FIGS. 4A-4C illustrates how time beacon transmissions are coordinated between layers of battery-powered devices within the wireless mesh network of FIG. 1, according to various embodiments of the present invention.
Figure 4B:
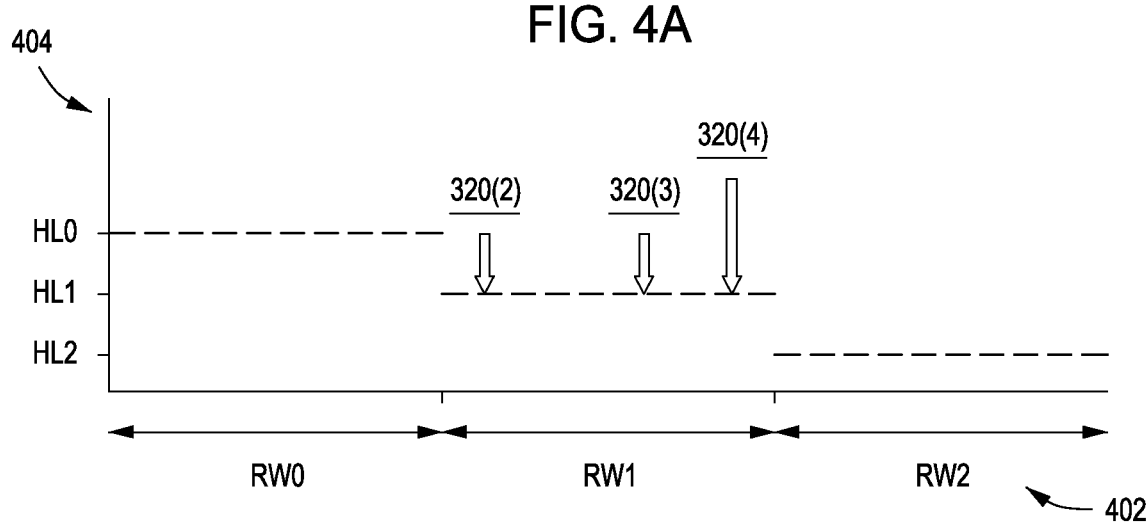
Figure 4C:
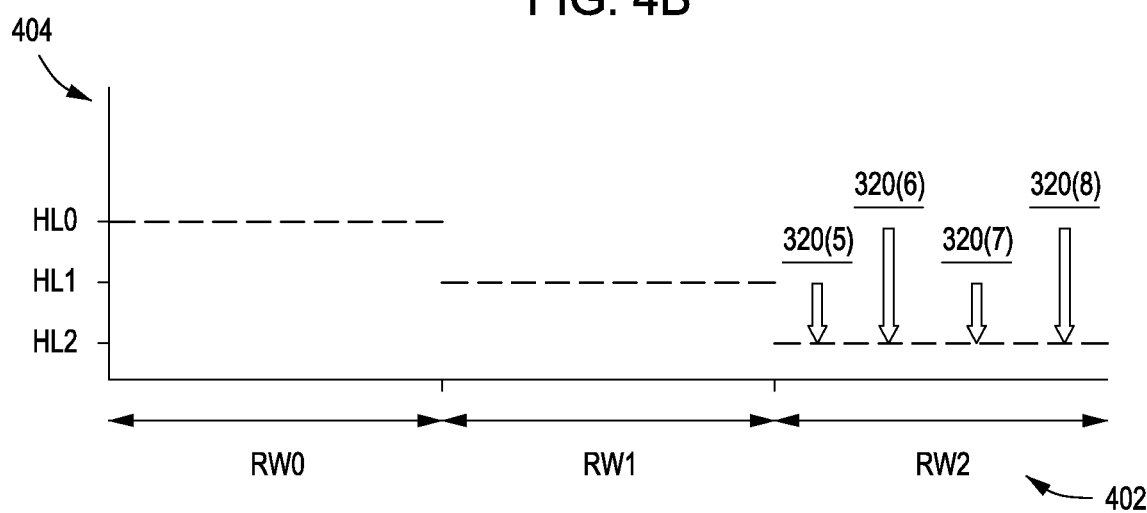

FIGS. 4A-4C illustrates how time beacon transmissions are coordinated between layers of battery-powered devices within the wireless mesh network of FIG. 1, according to various embodiments of the present invention. As show in each of FIGS. 4A-4C, a plot 400 includes a time axis 402 and a hop layer axis 404. Time axis 402 is divided into receive windows RW0, RW1, and RW2, as also discussed above in conjunction with FIGS. 3A-3D. Hop layer axis 404 is divided into hop layers HL0, HL1, and HL2, also discussed above in conjunction with FIGS. 3A-3D. As a general matter, plot 400 illustrates times when nodes included in different hop layers receive time beacons, as described in greater detail below.

As shown in FIG. 4A, nodes included in HL0 receive time beacons 320(0) and 320(1) during RW0. As shown in FIG. 4B, nodes included in HL1 receive time beacons 320(2), 320(3), and 320(4) during RW1. As shown in FIG. 4C, nodes included in HL2 receive time beacons 320(5), 320(6), 320 (7), and 320(8) during RW2.

Referring generally to FIGS. 4A-4C, each BPD 312 included in a given hop layer (HL1 or HL2) is configured to receive time beacons 320 during a receive window that corresponds to the given hop layer. As is shown, RW1 corresponds to HL1 and RW2 corresponds to HL2. A given BPD 312 is configured to power on and actively receive time beacons 320 during the corresponding receive window and to power down during other receive windows in order to conserve power, as described. In addition, a BPD 312 may receive continuously during the receive window or, alternatively, only receive intermittently during the receive window. For example, a BPD 312 could enter a low power sniff mode during periodic subintervals of time within the receive window and power down during other periodic subintervals of time within the receive window. If the BPD 312 detects energy associated with an incoming transmission during the receive window, the BPD 312 could then enter a higher power receive mode and receive the incoming transmission.

As described in greater detail below in conjunction with FIGS. 6-9B, each time beacon 320 includes an estimate of the current time and an estimate of the uncertainty associated with that time. When a BPD 312 receives a set of time beacons 320, the BPD 312 parses the time estimates and corresponding uncertainty estimates and then computes an average of those time estimates. In doing so, the BPD 312 weights each received time estimate with the corresponding uncertainty estimate and then averages the weighted time estimates to generate an estimate of the current time. The BPD 312 also combines the received uncertainty values to generate an uncertainty estimate for the current time estimate. The BPD 312 then modifies the uncertainty estimate based on clock drift associated with the BPD 312. Finally, the BPD 312 generates a time beacon that includes the current time (generally equal to the transmission time of the time beacon) and the modified uncertainty estimate, and then transmits this time beacon to neighboring nodes in downlink hop layers. In this fashion, BPDs 312 propagate time values throughout wireless mesh network 102. Again, this technique is described in detail below in conjunction with FIGS. 6-9B.

In one embodiment, a BPD 312 may expand or contract the receive window associated with the BPD 312 depending on the uncertainty of time maintained by the BPD 312. For example, if the uncertainty of time maintained by the BPD 312 increases, the BPD 312 could expand the receive window during which the BPD 312 powers on in order to mitigate that uncertainty and increase the likelihood of receiving incoming transmissions. Then, if the uncertainty of time maintained by the BPD 312 decreases, the BPD 312 could contract the receive window in order to conserve power.

Figure 5:
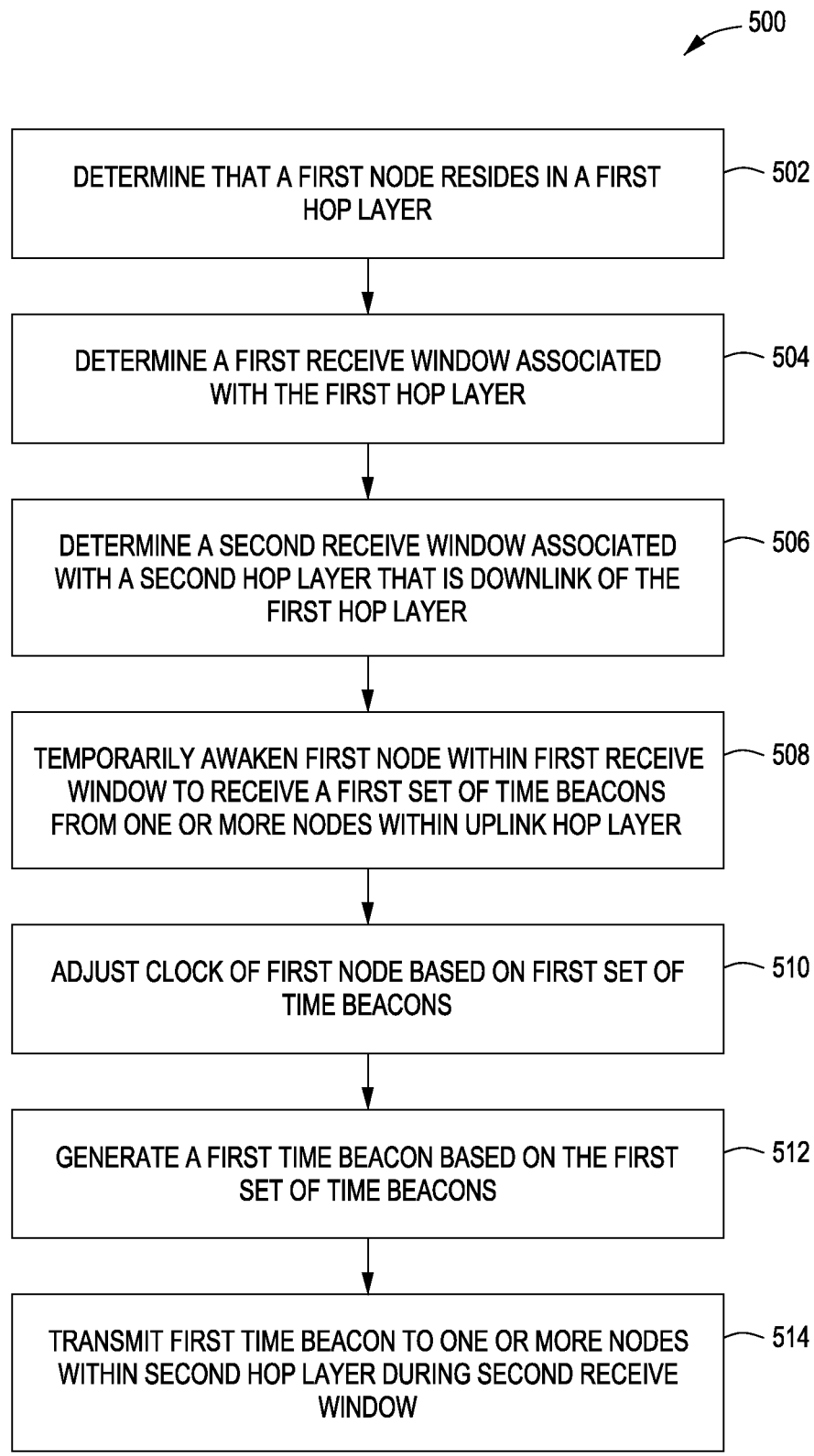
FIG. 5 is a flow diagram of method steps for distributing time beacons to nodes within a wireless mesh network based on hop layer, according to various embodiments of the present invention.

FIG. 5 is a flow diagram of method steps for distributing time beacons to nodes within a wireless mesh network based on hop layer, according to various embodiments of the present invention. Although the method steps are described in conjunction with the systems of FIGS. 1-4C, persons skilled in the art will understand that any system configured to perform the method steps, in any order, is within the scope of the present invention.

As shown, a method 500 begins at step 502, where a first node determines that the first node resides in a first hop layer. This first node may be one of the BPDs 312 shown in FIGS. 3A-3D. The first hop layer may be one of HL1 and HL2, also shown in FIGS. 3A-3D. At step 504 the first node determines a first receive window associated with the first hop layer. The first receive window may be RW1 or RW2 of FIGS. 3C-3D. At step 506, the first node determines a second receive window associated with a second hop layer that is downlink of the first hop layer. For example, if the first node resides in HL1 and receives during RW1, then the second receive window could be RW2.

At step 508, the first node temporarily awakens during the first receive window to receive a first set of time beacons 320 from one or more nodes included in an uplink hop layer. For example, the first node could reside in HL1 and awaken during RW1 to receive time beacons 320 from CPDs 302 within CPD mesh 300. At step 510, the first node adjusts the clock associated with the first node based on the received time beacons 320. In one embodiment, the first node computes a weighted average of the received time beacons 320. The first node may weight the time estimate included in a given time beacon 320 based on an uncertainty value associated with that time estimate. This approach is described in greater detail below in conjunction with FIGS. 6-9B.

At step 512, the first node generates a first time beacon based on the first set of time beacons. In doing so, the first node includes within the first time beacon the current time and estimated uncertainty of the current time at the time when the first time beacon is to be sent. This approach is also described in greater detail below in conjunction with FIGS. 6-9B. At step 514, the first node transmits the first time beacon to one or more nodes within the second hop layer during the second receive window. In one embodiment, the first node randomly selects a transmit time within the second time window. The randomly selected time may be computed once and then reused during future receive windows, or randomly selected each time the first node transmits. This approach may reduce packet collisions for nodes receiving during the second receive window. Upon transmitting the first time beacon, the first node may then power down until the first receive window occurs again.

The various nodes included in wireless mesh network 102 may perform the above technique in order to distribute time beacons throughout wireless mesh network 102. In addition, each node implements various techniques for processing received time beacons 320, updating a clock value, and generating new beacons to be transmitted downlink to other nodes. These techniques are described in greater detail below.

Mitigating Uncertainty in Time Values

Figure 6:
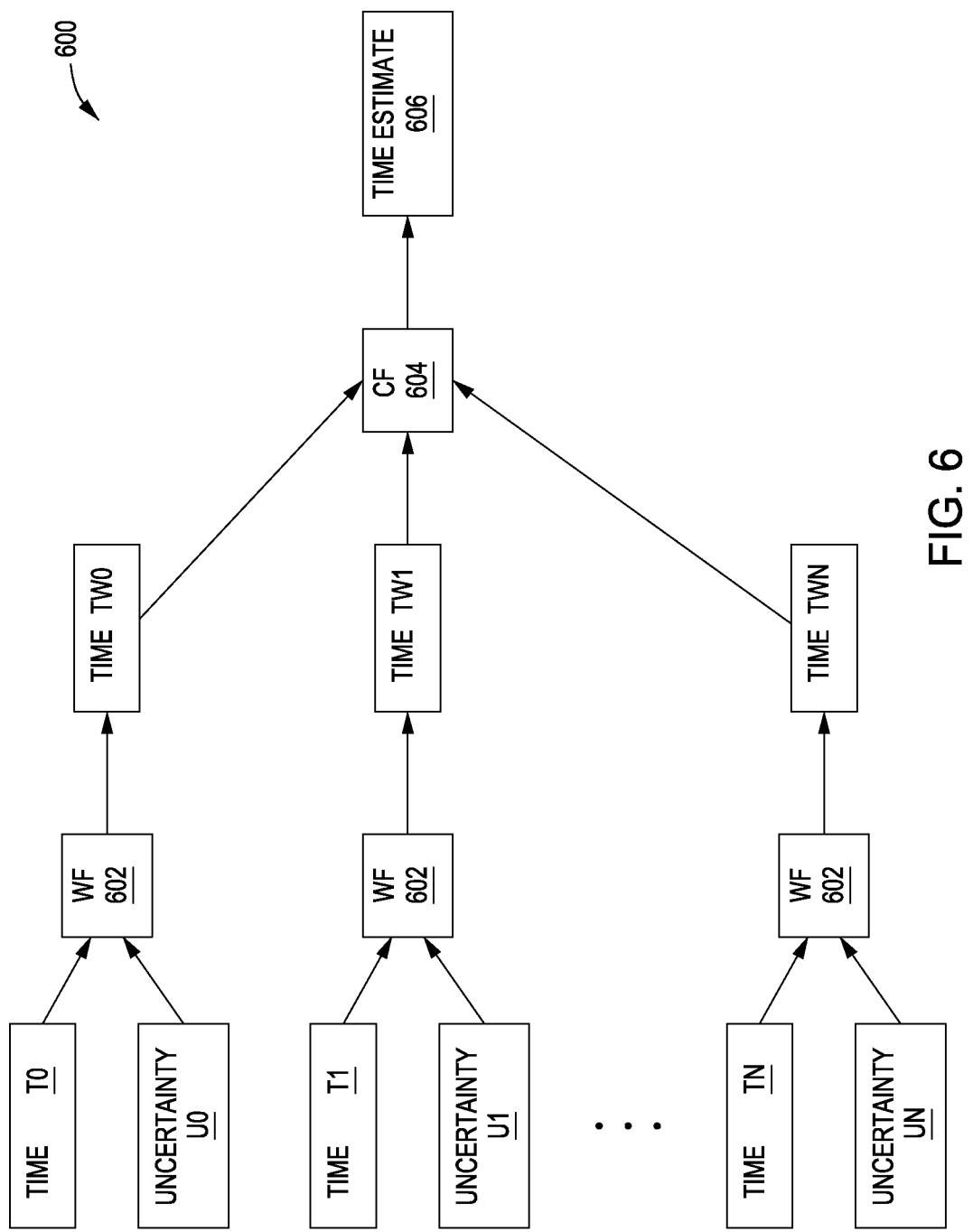
FIG. 6 is a data flow diagram illustrating how the nodes in the wireless mesh network of FIG. 1 compute time estimates, according to various embodiments of the present invention.

FIG. 6 is a data flow diagram illustrating how the nodes in the wireless mesh network of FIG. 1 compute time estimates, according to various embodiments of the present invention. As mentioned above in conjunction with FIGS. 4A-4C, a given BPD 312 is configured to receive time beacons 320 from uplink nodes and to then process the time estimates included in those time beacons to generate a combined estimate of the current time. Data flow 600 represents the process executed by the BPD 312 when combining the received time estimates.

As shown, data flow 600 includes several instances of a weight function (WF) 600 and a combining function (CF) 604. Each WF 602 receives a different time T0 through TN and corresponding uncertainty estimates U0 through UN. Each WF 602 then generates a different weighted time TW0 through TWN. A given weighted time represents a time estimate that is weighted based on the corresponding uncertainty estimate. In one embodiment, the BPD 312 normalizes each uncertainty estimate to fall between 0 and 1. CF 604 then combines the weighted times TW to generate time estimate 606. The BPD 312 may then update an internal clock to reflect time estimate 606.

Persons skilled in the art will understand that data flow diagram 600 is a generic depiction of a weighted averaging function meant only to illustrate one approach to combining time estimates based on corresponding uncertainty estimates. Any and all approaches to combining time estimates using associated uncertainty estimates falls within the scope of the invention. In addition, those skilled in the art will understand that "uncertainty" can be measured with a wide variety of metrics. For example, uncertainty in the context of time values could be expressed as a positive or negative time delta measured in milliseconds (ms) or another standard time interval. Alternatively, uncertainty could be expressed as a frequency delta measured in parts per million (PPM). In addition to performing the logic depicted in data flow diagram 600, a given BPD 312 is also configured to combine received uncertainty estimates to generate a combined uncertainty estimate associated with time estimate 606, as described in greater detail below in conjunction with FIG. 7.

Figure 7:
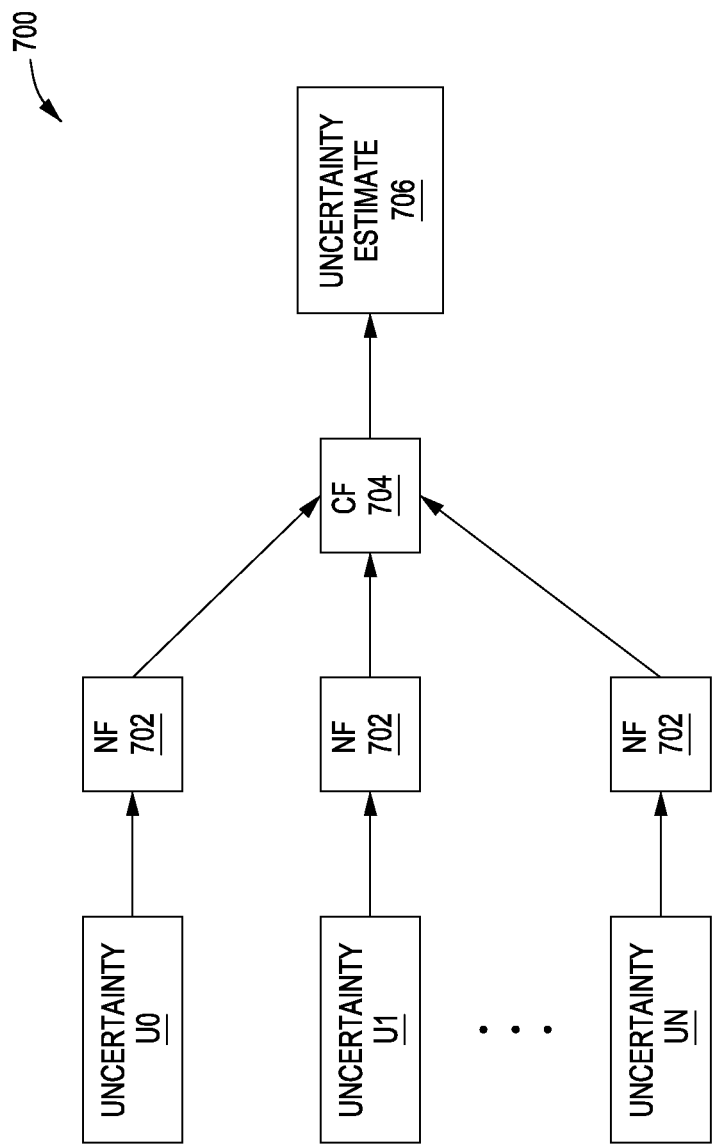
FIG. 7 is a data flow diagram illustrating how nodes in the wireless mesh network of FIG. 1 compute uncertainty estimates for the time estimates of FIG. 6, according to various embodiments of the present invention.

FIG. 7 is a data flow diagram illustrating how nodes in the wireless mesh network of FIG. 1 compute uncertainty estimates for the time estimates of FIG. 6, according to various embodiments of the present invention. As previously discussed, a given BPD 312 is configured to receive time beacons 320 from uplink nodes and to then process uncertainty estimates included in those time beacons to generate a combined uncertainty estimate. The combined uncertainty estimate reflects the uncertainty of the time estimate generated via the approach described above in conjunction with FIG. 6. Data flow 700 depicts the process executed by the BPD 312 when generating the combined uncertainty estimate.

As shown, data flow 700 includes various instances of normalizing function (NF) 702 and a combining function (CF) 704. Each NF 702 receives a different uncertainty estimate U0 through UN and then normalizes the received estimate to fall between zero and 1. In one embodiment, each NF 702 receives all uncertainty estimates U0 through UN, sums those values together, and then divides one uncertainty estimate by that sum in order to normalize the one uncertainty estimate to fall between zero and one. CF 704 receives the normalized uncertainty values and then combines those values to generate uncertainty estimate 706. Uncertainty estimate 706 represents the uncertainty associated with time estimate 606 discussed above in conjunction with FIG. 6.

Referring generally to FIGS. 6-7, by implementing data flows 600 and 700 a BPD 312 is configured to parse received time beacons 320 and to generate an estimate of the current time and an estimate of the uncertainty associated with that current time. Again, uncertainty may be measured as a time delta, a percentage error such as PPM, or using other metrics. In one embodiment, the BPD 312 discards received time beacons having an uncertainty estimate that falls beneath a given threshold. Based on the current time estimate, the BPD 312 updates an internal clock, as described, and then generates another time beacon via a technique described in greater detail below in conjunction with FIG. 8.

Figure 8:
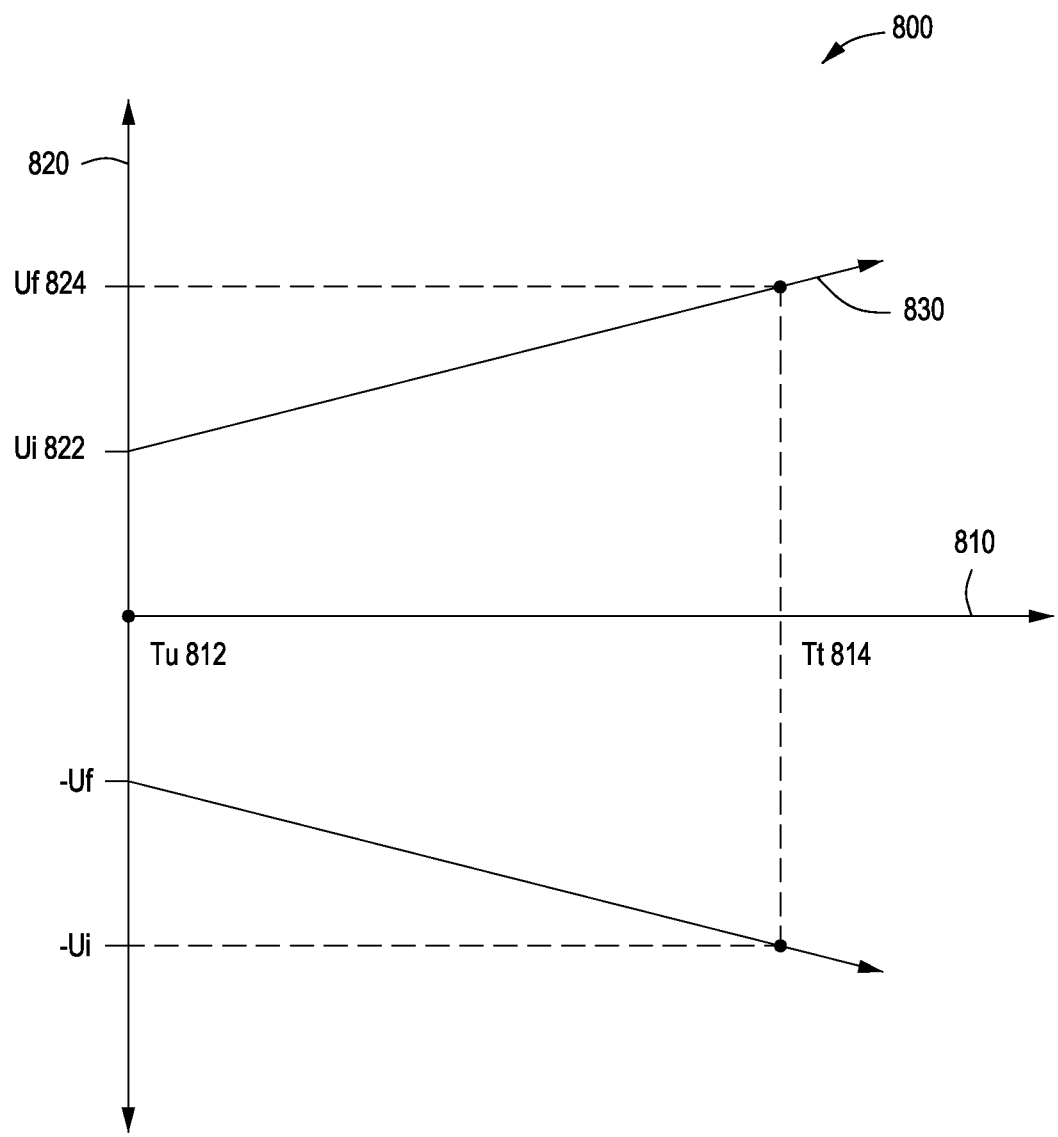
FIG. 8 illustrates the clock drift of a node in the wireless mesh network of FIG. 1 over a time interval, according to various embodiments of the present invention.

FIG. 8 illustrates the clock drift of a node in the wireless mesh network of FIG. 1 over a time interval, according to various embodiments of the present invention. As shown, a plot 800 includes a time axis 810 and an uncertainty axis 820. Time axis 810 includes an update time (Tu) 812 and a transmit time (Tt) 814. Tu 812 corresponds to time estimate 606, while Tt 814 is a subsequent time when BPD 312 is scheduled to transmit a time beacon. Uncertainty axis includes initial uncertainty (Ui) 822 and final uncertainty (Uf) 824. Ui 822 represents uncertainty estimate 706, and Uf 824 represents the predicted uncertainty of time maintained by the BPD 312 at Tt 814.

Plot 800 also depicts drift 830 as a function of time. Drift 830 represents the drift of an oscillator within a given BPD 312 over time. That oscillator could be, for example, oscillator 230 shown in FIG. 2. As known in the art, "clock drift" or "drift" is a natural phenomenon whereby the number of oscillations of a harmonic oscillator changes within a given time interval in response to environmental conditions. Those environmental conditions could be temperature changes, pressure changes, structural breakdown of the oscillator itself, and so forth.

Generally, plot 800 illustrates the predicted clock drift of an oscillator within the BPD 312 over a period of time between when a previous clock update was performed based on time estimate 606, and when a time beacon 320 is to be transmitted. Because the direction of clock drift generally may be unknown, drift 830 includes both positive and negative components corresponding to an oscillator with increasing or decreasing frequency, respectively, as is shown. In addition, drift 830 is biased by Ui 822 associated with uncertainty estimate 706. Generally, uncertainty estimate 706 represents the pre-existing uncertainty associated with time estimate 606 at Tu 812.

When the BPD 312 transmits time beacon 320 at Tt 814 to downlink BPDs 312, the BPD 312 includes within the time beacon both Tt 814, representing the current time, and Uf 824, representing the uncertainty of that current time. Upon receipt of one or more time beacons 320, each downlink BPD 312 may then perform a similar process as that described above in order to generate a time estimate, generate an uncertainty estimate, and then transmit a time beacon 320 to downlink nodes that includes the current time and uncertainty associated with that time.

Persons skilled in the art will understand that drift 830 may be determined using several techniques. For example, drift 830 could be computed empirically by the manufacturer of the oscillator and then pre-programmed into the BPD 312. Alternatively, drift 830 could be computed by the BPD 312 on an ongoing basis via periodic testing procedures. Further, drift 806 could be computed on a theoretical basis and therefore represent the predicted drift of a theoretical oscillator. Persons skilled in the art will recognize that other techniques for determining drift 830 may also be applied.

Figure 9A:
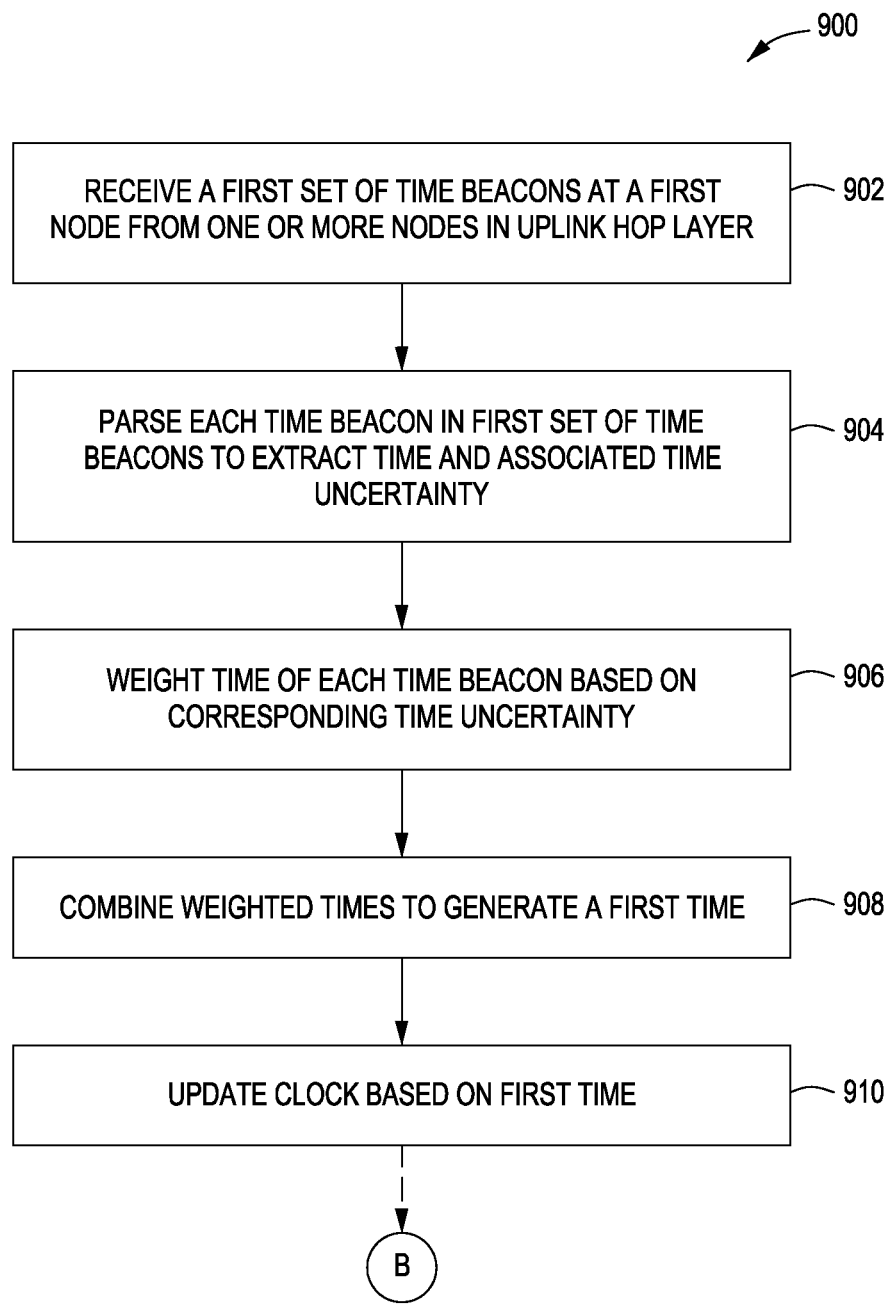
FIG. 9A is a flow diagram of method steps for generating time estimates, according to various embodiments of the present invention.

FIG. 9A is a flow diagram of method steps for generating time estimates, according to various embodiments of the present invention. Although the method steps are described in conjunction with the systems of FIGS. 1-4C and 6-8, persons skilled in the art will understand that any system configured to perform the method steps, in any order, is within the scope of the present invention.

As shown, a method 900 begins at step 902, where a BPD 312 receives a first set of time beacons from one or more nodes in an uplink hop layer. The nodes in the uplink hop layer could be CPDs 302 or BPDs 312. The received time beacons include an estimate of the current time and an uncertainty estimate corresponding to each time estimate. At step 904, the BPD 312 parses each time beacon in the first set of time beacons to extract the associated time estimate and uncertainty estimate.

At step 908, the BPD 312 weights the time value of each time beacon based on the corresponding uncertainty value. In doing so, BPD 312 may implement data flow 600 shown in FIG. 6. At step 908, the BPD 312 combines the weighted times to generate a first time. The first time could be time estimate 606 of FIG. 6. At step 910, the BPD 312 performs a clock update to update an internal clock to reflect the first time. In this manner, a given BPD 312 maintains an estimate of current time based on a set of received time beacons 320. The BPD 312 also then generates and transmits a time beacon, as described below in conjunction with FIG. 9B.

Figure 9B:
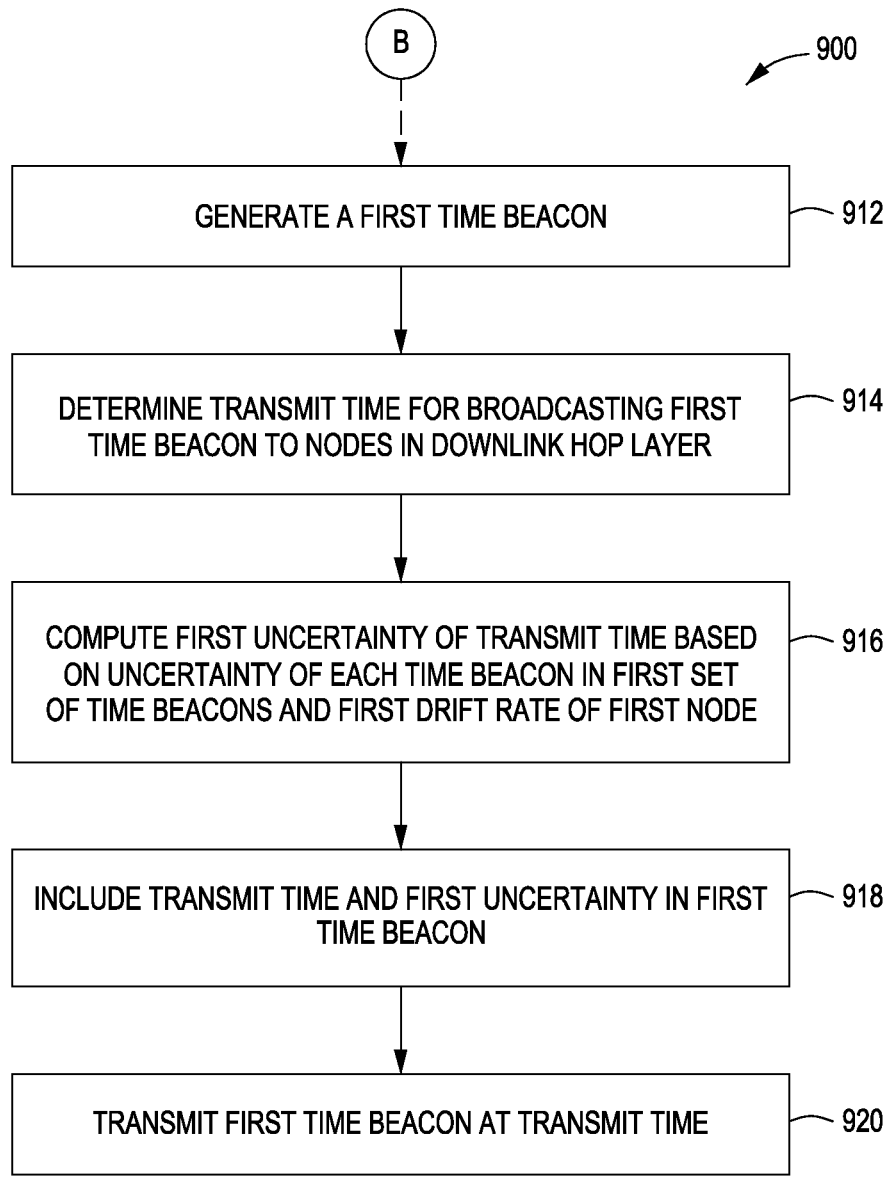
FIG. 9B is a flow diagram of method steps for transmitting time beacons to nodes in downlink hop layers of a wireless mesh network, according to various embodiments of the present invention.

FIG. 9B is a flow diagram of method steps for transmitting time beacons to nodes in downlink hop layers of a wireless mesh network, according to various embodiments of the present invention. Although the method steps are described in conjunction with the systems of FIGS. 1-4C and 6-8, persons skilled in the art will understand that any system configured to perform the method steps, in any order, is within the scope of the present invention.

As shown, the method 900 of FIG. 9A continues at step 912, where BPD 312 generates a time beacon. At step 914, the BPD 312 determines a transmit time for broadcasting the time beacon to nodes in a downlink hop layer. The transmit time could be, for example, Tt 814 of FIG. 8, and is generally derived by incrementing, based on oscillations of an oscillator, the current time estimate discussed above in conjunction with FIG. 9A.

At step 916, the BPD 312 computes an uncertainty of the transmit time based on the uncertainty estimates included in each time beacon in the first set of time beacons and the first drift rate of first node. In doing so, the BPD 312 may implement data flow 700 shown in FIG. 7 to generate an initial uncertainty value, and then implement the technique described in conjunction with FIG. 8 to estimate the uncertainty of the transmit time at the transmit time. At step 918 the BPD 312 includes the transmit time and the uncertainty estimate into the time beacon. At step 920, the BPD 312 transmits the time beacon to nodes in a downlink hop layer at the transmit time.

In sum, a wireless mesh network includes a mesh of continuously-powered devices (CPDs) and a mesh of battery-powered devices (BPDs). The BPDs are organized into hop layers based on hopping distance to the mesh of CPDs. The CPDs transmit time beacons to BPDs in a first hop layer during a first receive window associated with the first hop layer. The BPDs in the first hop layer then transmit time beacons to BPDs in a second hop layer during a second receive window. In this manner, the wireless mesh network propagates time values throughout the BPD mesh. Based on these time values, the BPDs power on during short time intervals to exchange data with neighboring BPDs, and then power off for longer time intervals, thereby conserving battery power. The techniques described herein for conserving battery power for BPDs may also be applied to conserve power consumption of CPDs.

At least one advantage of the techniques described herein is that battery-powered devices can operate within the wireless mesh network for long periods of time with a limited energy supply. Because the battery-powered devices propagate time throughout the wireless mesh network in the manner described, the battery-powered devices can coordinate data communications to occur during specific, scheduled times. Then, the battery-powered devices can power down to conserve energy during other times. In addition, because the battery-powered devices report the uncertainty of transmitted time beacons, other battery-powered devices can scale the size of receive windows to increase the likelihood that data transmissions are received.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for coordinating time across a mesh network, the method comprising:
    determining a first receive window associated with each node of a plurality of nodes included in a first hop layer of the wireless mesh network, wherein a first node resides within the first hop layer;
    determining a second receive window associated with each node of a plurality of nodes included in a second hop layer of the wireless mesh network, wherein a second node resides within the second hop layer, and the first receive window is different than the second receive window;
    receiving a first set of time beacons during the first receive window;
    generating a first time beacon based on the first set of time beacons; and
    transmitting the first time beacon from the first node to the second node during the second receive window.

2. The computer-implemented of claim 1, wherein receiving the first set of time beacons during the first receive window comprises:
    causing the first node to enter into a sniff mode during a first subinterval of time within the first receive window;
    detecting energy associated with a first time beacon included in the first set of time beacons;
    in response to detecting the energy, causing the first node to enter into a receive mode during the first subinterval of time, wherein operating in the receive mode consumes more power than operating in the sniff mode; and
    receiving the first time beacon during the first receive window.

3. The computer-implemented method of claim 2, wherein receiving the first set of time beacons during the first receive window further comprises:
    causing the first node to enter into a sleep mode during a second subinterval of time included in the first receive window, wherein operating in the sleep mode consumes less power than operating in the sniff mode;
    causing the first node to enter into the sniff mode during a third subinterval of time included in the first receive window;
    detecting energy associated with another time beacon included in the first set of time beacons;
    in response to detecting the energy, causing the first node to enter into the receive mode during the third subinterval of time; and
    receiving the another time beacon during the first receive window.

4. The computer-implemented method of claim 1, further comprising:
    randomly selecting a first transmit time within the second receive window; and
    transmitting the first time beacon to the second node at the first transmit time.

5. The computer-implemented method of claim 1, wherein generating the first time beacon based on the first set of time beacons further comprises:
    parsing each time beacon included in the first set of time beacons to extract a time estimate and an uncertainty estimate corresponding to the time estimate;
    weighting each time estimate based on a corresponding uncertainty estimate to generate a plurality of weighted time estimates; and
    combining the weighted time estimates included in the plurality of weighted time estimates to generate a first time estimate that is included in the first time beacon.

6. The computer-implemented method of claim 5, further comprising: combining each uncertainty estimate to generate a first uncertainty estimate associated with the first time estimate that also is included in the first time beacon.

7. The computer-implemented method of claim 1, wherein the first node performs the steps of determining, receiving, generating, and transmitting.

8. The computer-implemented method of claim 1, wherein the first receive window comprises a first interval of time, the second receive window comprises a second interval of time, and the first interval of time occurs before the second interval of time.

9. The computer-implemented method of claim 1, wherein each of the first node and the second node comprises a battery-powered node that resides within a battery-powered portion of the mesh network.

10. The computer-implemented method of claim 1, wherein the first node receives the first set of time beacons from one or more continuously-powered devices that reside within a continuously-powered portion of the mesh network.

11. A first node, comprising:
a memory storing program instructions; and
a processor coupled to the memory and configured to:
determine a first receive window associated with each node of a plurality of nodes included in a first hop layer of the wireless mesh network, wherein the first node resides within the first hop layer,
determine a second receive window associated with each node of a plurality of nodes included in a second hop layer of the wireless mesh network, wherein a second node resides within the second hop layer, and the first receive window is different than the second receive window,
receive a first set of time beacons during the first receive window,
generate a first time beacon based on the first set of time beacons, and
transmit the first time beacon from the first node to the second node during the second receive window.

12. The first node of claim 11, wherein the processor, upon executing the program instructions, is configured to:
determine the first receive window;
determine the second receive window;
receive the first set of time beacons;
generate the first time beacon based on the first set of time beacons; and
transmit the first time beacon to the second node.

13. The first node of claim 11, wherein the processor is configured to receive the first set of time beacons during the first receive window by:
causing the first node to enter into a sniff mode during a first subinterval of time within the first receive window;
detecting energy associated with a first time beacon included in the first set of time beacons;
in response to detecting the energy, causing the first node to enter into a receive mode during the first subinterval of time, wherein operating in the receive mode consumes more power than operating in the sniff mode; and
receiving the first time beacon during the first receive window.

14. The first node of claim 13, wherein the processor is further configured to receive the first set of time beacons during the first receive window by:
causing the first node to enter into a sleep mode during a second subinterval of time included in the first receive window, wherein operating in the sleep mode consumes less power than operating in the sniff mode;
causing the first node to enter into the sniff mode during a third subinterval of time included in the first receive window;
detecting energy associated with another time beacon included in the first set of time beacons;
in response to detecting the energy, causing the first node to enter into the receive mode during the third subinterval of time; and
receiving the another time beacon during the first receive window.

15. The first node of claim 11, wherein the processor is further configured to:
randomly select a first transmit time within the second receive window; and
transmit the first time beacon to the second node at the first transmit time.

16. The first node of claim 11, wherein the processor is configured to generate the first time beacon based on the first set of time beacons by:
parsing each time beacon included in the first set of time beacons to extract a time estimate and an uncertainty estimate corresponding to the time estimate;
weighting each time estimate based on a corresponding uncertainty estimate to generate a plurality of weighted time estimates; and
combining the weighted time estimates included in the plurality of weighted time estimates to generate a first time estimate that is included in the first time beacon.

17. The first node of claim 16, wherein the processor is further configured to combine each uncertainty estimate to generate a first uncertainty estimate associated with the first time estimate that also is included in the first time beacon.

18. The first node of claim 11, wherein the first receive window comprises a first interval of time, the second receive window comprises a second interval of time, and the first interval of time occurs before the second interval of time.

19. The first node of claim 11, wherein each node in the first hop layer resides one hop away from an access point, and each node in the second hop layer resides two hops away from the access point, and wherein each node included in the first hop layer and the second hop layer comprises a battery-powered node.

20. A non-transitory computer-readable medium storing program instructions that, when executed by a processor, cause the processor to coordinate time across a mesh network, by performing the steps of:
determining a first receive window associated with each node of a plurality of nodes included in a first hop layer of the wireless mesh network, wherein a first node resides within the first hop layer;
determining a second receive window associated with each node of a plurality of nodes included in a second hop layer of the wireless mesh network, wherein a second node resides within the second hop layer, and the first receive window is different than the second receive window;
receiving a first set of time beacons during the first receive window;
generating a first time beacon based on the first set of time beacons; and
transmitting the first time beacon from the first node to the second node during the second receive window.

* * * * *